(12) United States Patent
Solaro et al.

(10) Patent No.: US 11,089,345 B2
(45) Date of Patent: Aug. 10, 2021

(54) PROGRAMMATIC GENERATION OF MEDIA CONTENT DIGESTS

(71) Applicant: Disney Enterprises, Inc., Burbank, CA (US)

(72) Inventors: John M. Solaro, Burbank, CA (US); Alexis J. Lindquist, Los Angeles, CA (US); Anthony M. Accardo, Los Angeles, CA (US); Avner Swerdlow, Los Angeles, CA (US); Miquel Angel Farre Guiu, Bern (CH); Katharine S. Ettinger, Santa Monica, CA (US)

(73) Assignee: Disney Enterprises, Inc., Burbank, CA (US)

( * ) Notice: Subject to any disclaimer, the term of this patent is extended or adjusted under 35 U.S.C. 154(b) by 11 days.

(21) Appl. No.: 15/646,469

(22) Filed: Jul. 11, 2017

(65) Prior Publication Data
US 2019/0020912 A1  Jan. 17, 2019

(51) Int. Cl.
*H04H 60/32* (2008.01)
*H04N 21/25* (2011.01)
*H04N 21/45* (2011.01)
*H04N 21/81* (2011.01)
*H04N 21/84* (2011.01)
(Continued)

(52) U.S. Cl.
CPC ....... *H04N 21/251* (2013.01); *H04N 21/2393* (2013.01); *H04N 21/25891* (2013.01); *H04N 21/4532* (2013.01); *H04N 21/4722* (2013.01); *H04N 21/4755* (2013.01); *H04N 21/812* (2013.01); *H04N 21/84* (2013.01); *H04N 21/8456* (2013.01); *H04N 21/8547* (2013.01); *H04N 21/8549* (2013.01)

(58) Field of Classification Search
CPC ......... H04N 21/25891; H04N 21/8456; H04N 21/47202; H04N 21/41407; H04N 21/44029; H04N 21/4532; H04N 21/4667; H04N 21/8549; H04N 21/251; H04N 21/2393; H04N 21/4722; H04N 21/812; H04N 21/84; H04N 21/8547; G06F 9/5044
See application file for complete search history.

(56) References Cited

U.S. PATENT DOCUMENTS

9,286,938 B1 *  3/2016  Tseytlin ........... H04N 21/23439
9,826,285 B1 * 11/2017  Mishra ................. G06K 9/6296
(Continued)

*Primary Examiner* — Mulugeta Mengesha
(74) *Attorney, Agent, or Firm* — Farjami & Farjami LLP (57) ABSTRACT

According to one implementation, a system for programmatic generation of media content digests includes a computing platform having a hardware processor and a system memory storing a media content digest software code. The hardware processor executes the media content digest software code to identify a media content for use in generating a content digest, the media content including a timecode of the media content, to access a metadata describing the media content and indexed to the timecode, and to identify one or more constraints for the content digest. In addition, the hardware processor executes the media content digest software code to programmatically extract content segments from the media content using the metadata indexed to the timecode and based on the one or more constraints, and to generate the content digest based on the media content from the content segments.

14 Claims, 4 Drawing Sheets

(51) Int. Cl.
*H04N 21/845* (2011.01)
*H04N 21/4722* (2011.01)
*H04N 21/8547* (2011.01)
*H04N 21/258* (2011.01)
*H04N 21/475* (2011.01)
*H04N 21/239* (2011.01)
*H04N 21/8549* (2011.01)

(56) References Cited

U.S. PATENT DOCUMENTS

| | | | | |
|---|---|---|---|---|
| 2003/0187919 | A1* | 10/2003 | Nakamura | H04N 7/17336 709/203 |
| 2007/0157237 | A1* | 7/2007 | Cordray | H04N 21/4532 725/42 |
| 2008/0086747 | A1* | 4/2008 | Rasanen | H04N 21/4622 725/46 |
| 2009/0100454 | A1* | 4/2009 | Weber | G11B 27/28 725/9 |
| 2011/0130852 | A1* | 6/2011 | Thorn | G06F 17/30029 700/94 |
| 2012/0158514 | A1* | 6/2012 | Aldrey | G06Q 30/0631 705/14.66 |
| 2014/0019635 | A1* | 1/2014 | Reznik | H04L 65/607 709/231 |
| 2014/0281976 | A1* | 9/2014 | Chia | G06F 16/954 715/716 |
| 2016/0359937 | A1* | 12/2016 | Chung | H04N 21/234363 |
| 2016/0373817 | A1* | 12/2016 | Drake | H04N 21/44029 |

* cited by examiner

PROGRAMMATIC GENERATION OF MEDIA CONTENT DIGESTS

BACKGROUND

The popularity of video as an entertainment medium has resulted in a wide variety of video based media content being produced and made available to consumers. Such media content may include video shorts, long form movie content, and intermediate form episodic television programming content, for example. In addition to the variety of available media content, the media players commonly utilized to consume such content are implemented on a wide variety of hardware platforms. Examples of those platforms include mobile communication devices such as Smartphones, portable devices such as tablet computers, and home based entertainment systems such as Smart TVs, satellite or cable set-top boxes, and video on demand (VOD) media players.

The generally advantageous viewer control over when and where media content is consumed that is enabled by the variety of media player platforms can give rise to some frustrations, however. For example, rather than viewing a portion of long or intermediate form content in a single session, a commuter may prefer an abbreviated version of that content tailored to the length of their commute. Conversely, a home viewer watching video shorts may prefer to watch a sequence of relevant or interesting selections that have been curated for them personally, rather than to have to manually select each short for themselves.

SUMMARY

There are provided systems and methods for programmatic generation of media content digests, substantially as shown in and/or described in connection with at least one of the figures, and as set forth more completely in the claims.

DETAILED DESCRIPTION

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

As stated above, the popularity of video as an entertainment medium has resulted in a wide variety of video based media content being produced and made available to consumers. Such media content may include video shorts, long form movie content, and intermediate form episodic television programming content, for example. In addition to the variety of available media content, the media players commonly utilized to consume such content are implemented on a wide variety of hardware platforms, including mobile and home based systems.

As further stated above, the generally advantageous viewer control over when and where media content is consumed that is enabled by the variety of media player platforms can give rise to some frustrations. For example, rather than viewing a portion of long or intermediate form content in a single session, a commuter may prefer an abbreviated version of that content tailored to the length of their commute. Conversely, a home viewer watching video shorts may prefer to watch a sequence of relevant or interesting selections that have been curated for them personally, rather than to have to manually select each short for themselves.

The present application discloses systems and methods for programmatic generation of media content digests that address and overcome the deficiencies in the conventional art described above. By identifying media content for use in generating a content digest, and accessing metadata describing the media content and indexed to a timecode of that content, the present solution can determine an accurate mapping of the media content. Moreover, by identifying one or more constraints for the content digest, and programmatically extracting content segments from the media content using the metadata and the one or more constraints, the present solution advantageously enables a precise partitioning of the media content. Those precisely partitioned content extracts can then be assembled to generate the content digest based on the media content.

It is noted that, as used in the present application, the terms "programmatic" and "programmatically" refer to automated systems and processes that do not require the participation of a human editor or human content curator. Although, in some implementations, a human editor or curator may review a programmatically generated media content digest, or may choose to intervene to modify such a content digest, that review and/or intervention is optional. Thus, the systems disclosed in the present application may be substantially automated systems, and the methods disclosed herein may be performed under the control of hardware processing components of such substantially automated systems.

Figure 1:
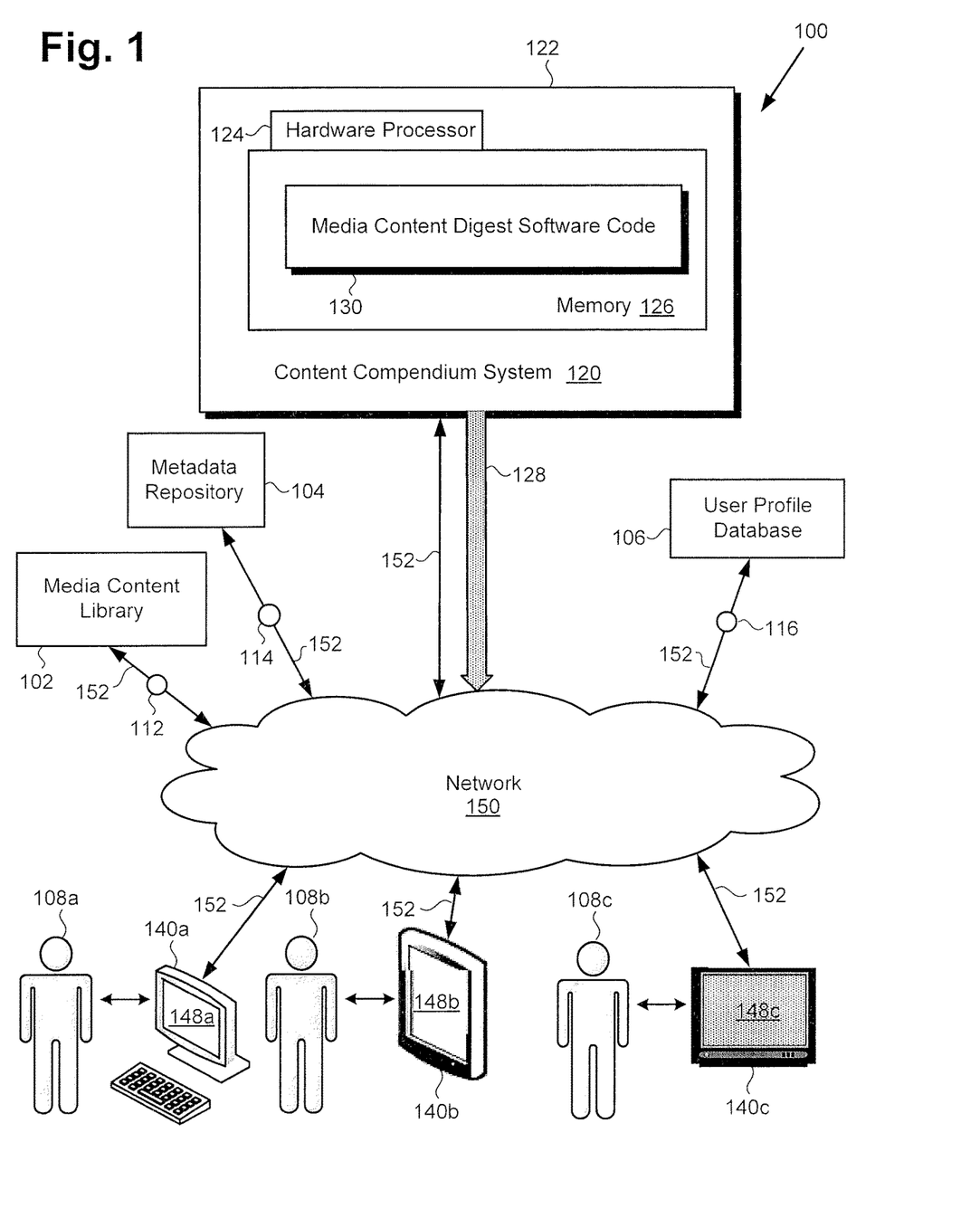
FIG. 1 shows an exemplary system for programmatically generating media content digests, according to one implementation.

FIG. 1 shows an exemplary system for programmatically generating media content digests, according to one implementation. As shown in FIG. 1, system environment 100 includes content compendium system 120 having computing platform 122. According to the exemplary implementation shown in FIG. 1, computing platform 122 includes hardware processor 124, and system memory 126 storing media content digest software code 130. Also shown in FIG. 1 are media content library 102 providing media content 112, metadata repository 104 providing timecode indexed metadata 114, user profile database 106 providing user profile 116, and media content digest 128 generated programmatically using media content digest software code 130 executed by hardware processor 124 of content compendium system 120.

In addition, FIG. 1 shows client systems 140a, 140b, and 140c (hereinafter "client systems 140a-140c") and respective users 108a, 108b, and 108c of client systems 140a-140c (hereinafter "system users 108a-108c"). As further shown in FIG. 1, client systems 140a-140c, media content library 102, metadata repository 104, and user profile database 106 are interactively linked to content compendium system 120 via communication network 150 and network communication links 152. Thus, content compendium system 120 may receive media content 112, timecode indexed metadata 114, and user profile 116, and may provide media content digest 128 to one or more of client systems 140a-140c, via communication network 150 and network communication links 152. Further shown in FIG. 1 are displays 148a, 148b, and 148c (hereinafter "displays 148a-148c") of respective client systems 140a-140c.

It is noted that computing platform 122 of content compendium system 120 may be implemented using one or more content servers, which may be co-located, or may form an interactively linked but distributed system. For example, content compendium system 120 may be a cloud-based content compendium system. As a result, hardware processor 124 and system memory 126 may correspond to distributed processor and memory resources within content compendium system 120.

It is further noted that, although client systems 140a-140c are shown variously as personal computer (PC) 140a, mobile communication device 140b, and smart TV 140c, in FIG. 1, those representations are provided merely by way of example. In other implementations, for instance, client systems 140a-140c may take the form of any suitable device or system including a media player and a display, such as a laptop computer, tablet computer, smartphone, or home entertainment system including a satellite or cable set-top box, for example. It is also noted that displays 148a-148c may take the form of liquid crystal displays (LCDs), light-emitting diode (LED) displays, organic light-emitting diode (OLED) displays, or any other suitable display screens that perform a physical transformation of signals to light.

Media content 112 may be movie content or television programming content, for example, including ultra high-definition (ultra HD), HD, or standard-definition (SD) baseband video with embedded audio, captions, timecode, and other ancillary data, such as ratings and/or parental guidelines. In some implementations, media content 112 may include multiple audio tracks, and may utilize secondary audio programming (SAP) and/or Descriptive Video Service (DVS), for example.

In one implementation, media content 112 may include the same source video that is broadcast to a traditional TV audience using a TV broadcasting platform (not shown in FIG. 1), which may include a conventional cable and/or satellite network, for example. As depicted in FIG. 1, in some use cases it may be advantageous or desirable to make content corresponding to media content 112 available via an alternative distribution channel, such as communication network 150, which may take the form of a packet-switched network, for example, such as the Internet. For example, content compendium system 120 may utilize communication network 150 to provide media content digest 128 based on media content 112 as part of an Internet Protocol (IP) content stream.

Figure 2:
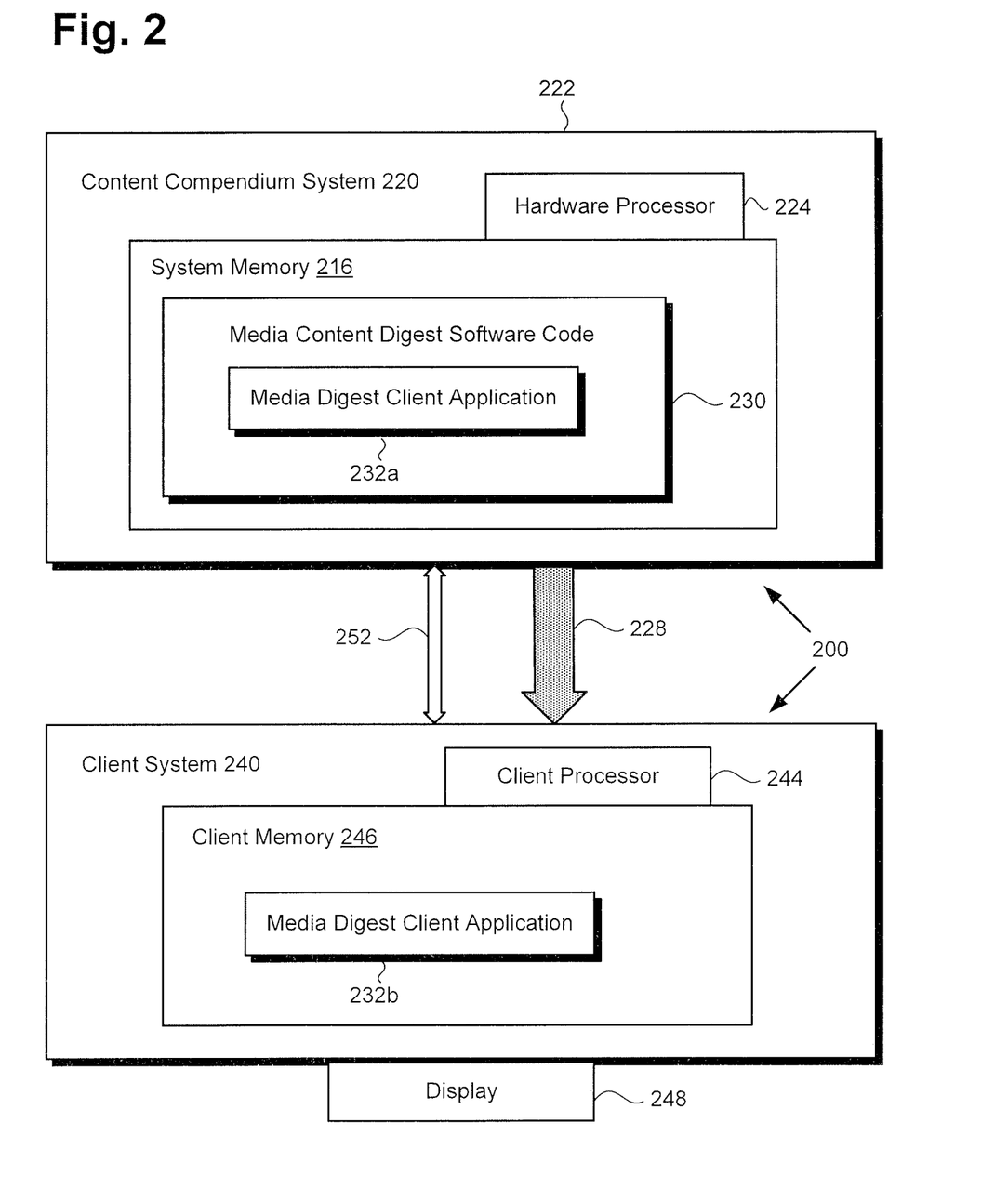
FIG. 2 shows another exemplary implementation of a system for programmatically generating media content digests.

FIG. 2 shows another exemplary implementation of a system for programmatically generating media content digests. System environment 200 includes content compendium system 220 having computing platform 222 interactively connected to client system 240 via network communication link 252. Computing platform 222 includes hardware processor 224, and system memory 226 storing media content digest software code 230 including media digest client application 232a. As shown in FIG. 2, client system 240 includes client hardware processor 244, client system memory 246 storing media digest client application 232b, and display 248. Also shown in FIG. 2 is media content digest 228 provided by content compendium system 220 to client system 240.

Network communication link 252, media content digest 228, and content compendium system 220, correspond respectively in general to network communication link 152, media content digest 128, and content compendium system 120, in FIG. 1. In addition, media content digest software code 230, in FIG. 2, corresponds in general to media content digest software code 130, in FIG. 1. In other words, media content digest software code 230 and media content digest software code 130 may share any of the characteristics attributed to either corresponding feature by the present disclosure. Moreover, client system 240 and display 248 correspond respectively in general to any of client systems 140a-140c and displays 148a-148c in FIG. 1, and those respective corresponding features may share the characteristics attributed to any corresponding feature by the present disclosure.

According to the exemplary implementation shown in FIG. 2, media digest client application 232b is located in client system memory 246, having been received from content compendium system 220 via network communication link 252. In one implementation, network communication link 252 corresponds to transfer of media digest client application 232b over a packet-switched network, such as the Internet, for example. Once transferred, for instance by being downloaded over network communication link 252, media digest client application 232b may be persistently stored in client system memory 246 and may be executed locally on client system 240 by client hardware processor 244.

Client hardware processor 244 may be the central processing unit (CPU) for client system 240, for example, in which role client hardware processor 244 runs the operating system for client system 240 and executes media digest client application 232b. In the exemplary implementation of FIG. 2, client system 140a-140c/240 can utilize media digest client application 232b to interact with content compendium system 120/220, such as by providing a media consumption history or a content preference of one of system users 108a-108c, or to communicate an input received from one of system users 108a-108c.

It is noted that in some implementations, media content digest 128/228 can be generated on client system 140a-140c/240 based on existing streaming technologies that contain a playlist of available media content 112, e.g., different episodes of a show and/or advertising tailored to one of system users 108a-108c. Examples of such streaming technologies include Moving Picture Experts Group (MPEG), Dynamic Adaptive Streaming over HTTP (DASH), and HTTP Live Streaming (HLS), to name a few. An accompanying manifest may contain information describing the duration of media content 112 as well as timecode indexed metadata 114. However, in one implementation, timecode indexed metadata 114 may be transmitted to client system 140a-140c/240 independently of the playlist and manifest.

In implementations in which media content digest 128/228 is generated on client system 140a-140c/240, that functionality can be enabled by media digest client application 232b. For example, media digest client application 232b, executed by client processor 244, may be configured to generate a new streaming manifest, e.g., DASH or HLS, that will be used for playback directly from media content library 102.

One advantage of such an implementation is that the manifest containing portions of media content digest 128/228 can be common to more than one of system users 108a-108c, thereby reducing the workload on content compendium system 120/220. In addition, such an implementation advantageously allows users 108a-108c to change media content digest constraints during playback.

For example, system user 108b may have initially wanted content digest 128/228 having a time duration of twenty minutes due to the anticipated length of a commute, but travel is slower than expected and system user 108b would like to extend the duration of content digest 128/228 to thirty minutes. As another example, if one of system users 108a-108c is unhappy with some portion of content digest 128/228, that system user may provide an input to one of client systems 140a-140c/240 to that effect, such as by tapping display 148a-148c/248. Based on that input, media content digest 128/228 and/or user profile 116 may be updated accordingly. Moreover, in some implementations, media content digest 128/228 may be updated substantially in real-time relative to the input from the system user.

Figure 3:
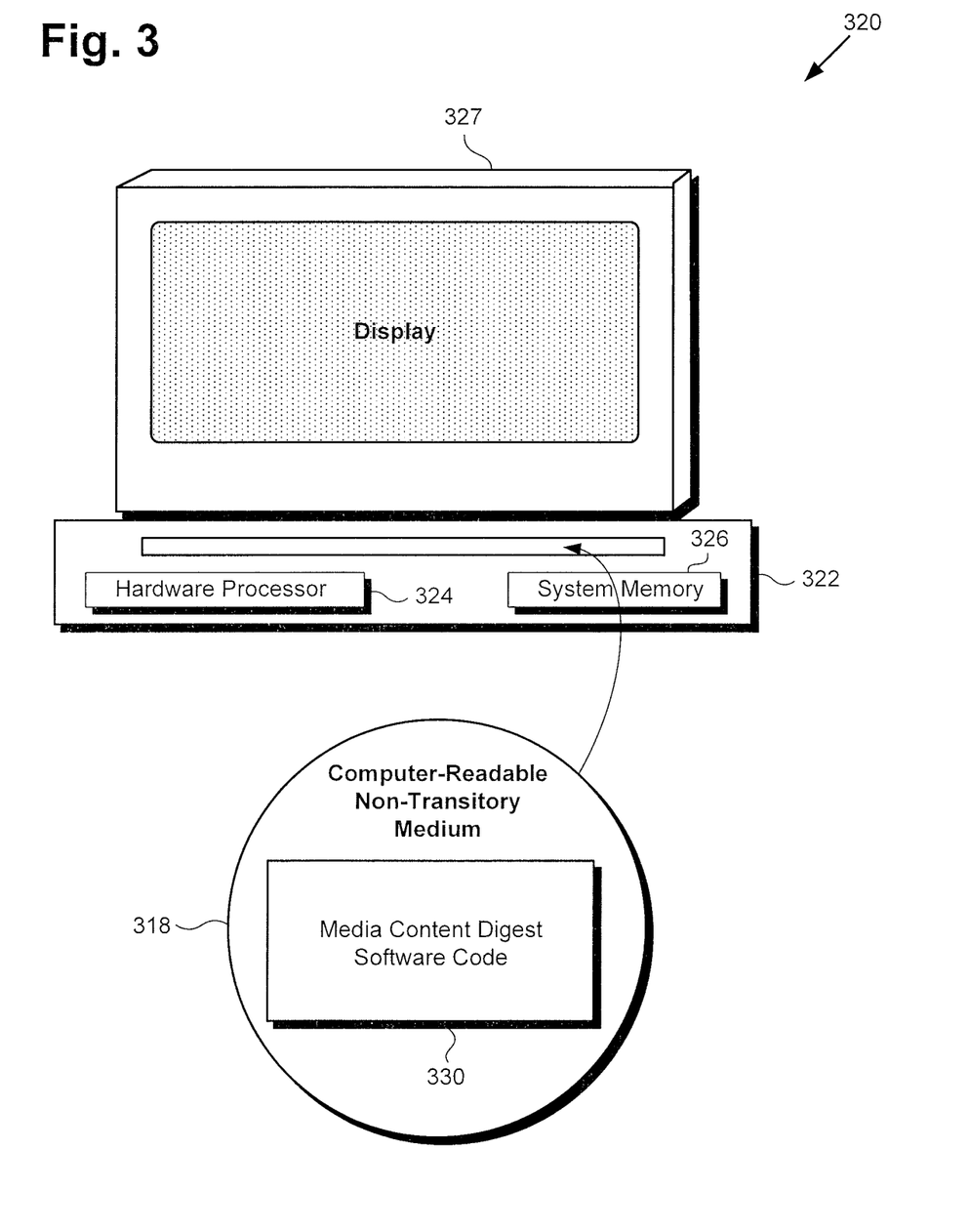
FIG. 3 shows an exemplary system and a computer-readable non-transitory medium including instructions enabling execution of a method for programmatically generating media content digests, according to one implementation.

FIG. 3 shows exemplary system 320 and computer-readable non-transitory medium 318 including instructions enabling execution of a method for programmatically generating media content digests, according to one implementation. System 320 includes computing platform 322 having hardware processor 324 and system memory 326, interactively linked to display 327. Display 327 may take the form of an LCD, LED display, OLED display, or another suitable display screen that performs a physical transformation of signals to light. System 320 including display 327, and computing platform 322 having hardware processor 324 and system memory 326, correspond in general to content compendium systems 120/220, in FIGS. 1 and 2.

Also shown in FIG. 3 is computer-readable non-transitory medium 318 having media content digest software code 330 stored thereon. The expression "computer-readable non-transitory medium," as used in the present application, refers to any medium, excluding a carrier wave or other transitory signal, that provides instructions to hardware processor 324 of system 320. Thus, a computer-readable non-transitory medium may correspond to various types of media, such as volatile media and non-volatile media, for example. Volatile media may include dynamic memory, such as dynamic random access memory (dynamic RAM), while non-volatile memory may include optical, magnetic, or electrostatic storage devices. Common forms of computer-readable non-transitory media include, for example, optical discs, RAM, programmable read-only memory (PROM), erasable PROM (EPROM), and FLASH memory.

According to the implementation shown in FIG. 3, computer-readable non-transitory medium 318 provides media content digest software code 330 for execution by hardware processor 324 of system 320. Media content digest software code 330 corresponds in general to media content digest software code 130/230, in FIGS. 1 and 2, and is capable of performing all of the operations attributed to those corresponding features by the present disclosure. In other words, in implementations in which hardware processor 124/224/324 of systems 120/220/320 access computer-readable non-transitory medium 318 and execute media digest client application 130/230/330, system 320 may perform any of the actions attributed to content compendium system 120/220 by the present disclosure.

Figure 4:
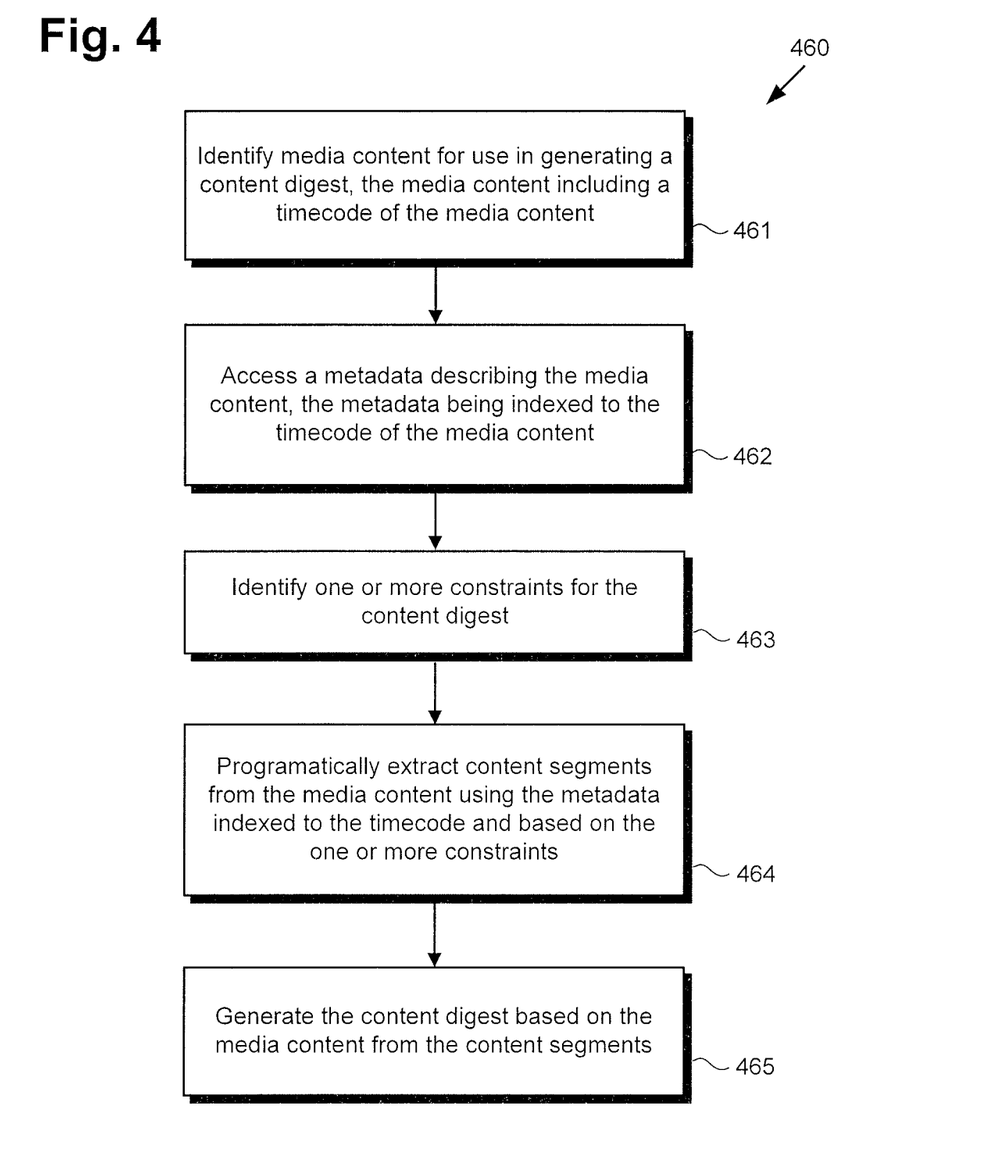
FIG. 4 shows a flowchart presenting an exemplary method for programmatically generating media content digests, according to one implementation.

The functionality of media content digest software code 130/230/330 will be further described by reference to FIG. 4. FIG. 4 shows flowchart 460 presenting an exemplary method for use by a system, such as system 120/220/320, for programmatically generating media content digests.

Referring now to FIG. 4 in combination with FIGS. 1, 2, and 3, flowchart 460 begins with identifying media content 112 for use in generating media content digest 128/228 (hereinafter "content digest 128/228"), media content 112 including a timecode of media content 112 (action 461). By way of example, in some implementations, media content 112 may be identified based on an input received from one of system users 108a-108c, via media digest client application 232b on client system 140a-140c/240. In those implementations, one of system users 108a-108c may utilize media digest client application 232b to submit a request to system 120/220/320 for content digest 128/228 based on media content 112.

As noted above, media content 112 may take the form of television programming content or movie content including a timecode for that content. In those implementations, one of system 108a-108c may submit a request for content digest 128/228 based on a specific movie, television series, television episode, or other unit of television programming, using media digest client application 232b. Alternatively, media content 112 may be a video short, and identification of media content 112 may be based on a subject matter category requested by one of system users 108a-108c, rather than based on an express request for a particular video short.

As yet another alternative example, media content 112 may include advertising, or another type of promotional content, including a timecode for that content. In those implementations, media content 112 for use in generating content digest 128/228 may be identified based on user profile 116 of one of system users 108a-108c. User profile 116 may include a media consumption history and/or content preferences of one of system users 108a-108c. In those implementations, media content 112 may be identified based on that media consumption history and/or those content preferences. Identification of media content 112 may be performed by system 120/220/320 using media content digest software code 130/230/330, executed by hardware processor 124/224/324.

Flowchart 460 continues with accessing timecode indexed metadata 114 (hereinafter "metadata 114") describing media content 112, metadata 114 being indexed to the timecode of media content 112 (action 462). Metadata 114 may be deep, structured metadata, and may be timecode indexed at a fine level of granularity, such as at time intervals of one or more seconds or fractions of seconds, for example.

As a specific example, where media content 112 includes a particular episode of a serialized television drama or comedy, metadata 114 may include the storylines and overarching plot threads of previous and future episodes, as well as temporal metadata attached to key scenes. Examples of key scenes may include cliffhanger scenes, scenes including major plot reveals, and scenes including poignant or otherwise significant character interactions, to name a few.

Metadata 114 may be obtained from metadata repository 104, accessible by system 120/220/320 via communication network 150. Metadata 114 describing media content 112 may be accessed by system 120/220/320 using media content digest software code 130/230/330, executed by hardware processor 124/224/324.

Flowchart 460 continues with identifying one or more constraints for content digest 128/228 (action 463). Identification of one or more constraints for content digest 128/228 may be performed by system 120/220/320 using media content digest software code 130/230/330, executed by hardware processor 124/224/324.

In some implementations, the one or more constraints for content digest 128/228 may be identified based on one or more inputs received from one of system users 108a-108c, via media digest client application 232b on client system 140a-140c/240. In those implementations, one of system users 108a-108c may utilize media digest client application 232b to submit a request constraining content digest 128/228.

In some implementations, the constraint or constraints imposed upon content digest 128/228 may include a time duration of content digest 128/228. For example, and as noted above, in some use cases a commuter may wish to view an abbreviated version of long form movie content or intermediate form television programming content tailored to the length of their commute. As a specific example, system user 108b may be a commuter using client system mobile device 140b to access entertainment content over communication network 150 during a commute. System user 108b may have a thirty-five minute commute and may wish to watch an abbreviated version of a forty-eight minute television episode, substantially in its entirety, during that commute. In that specific example, system user 108b may provide an input to media digest client application 232b constraining content digest 128/228 to have a time duration of not more than thirty minutes, for example.

Alternatively, media content digest software code 130/230/330, executed by hardware processor 124/224/324, may detect that client system 140b is a mobile communication device, and constrain, or offer to constrain, the time duration of content digest 128/228 on that basis. For example, in some implementations, media content digest software code 130/230/330 might impose a predetermined time duration constraint on content digest 128/228 based on identification of client system 140b as a mobile communication device. However, in other implementations, media content digest software code 130/230/330 may communicate with system user 108b via media digest client application 232b to solicit a time duration constraint based on identification of client system 140b as a mobile communication device.

In yet other implementations, the one or more constraints for content digest 128/228 may correspond to one of system users 108a-108c, but not be affirmatively provided as an input by any of system users 108a-108c. In those implementations, the one or more constraints for content digest 128/228 may be identified based on user profile 116 of one of system users 108a-108c, for example. As noted above, user profile 116 may include a media consumption history of one of system users 108a-108c. Thus, the one or more constraints for content digest 128/228 may be identified based on that media consumption history.

Once again by way of example, system user 108a may wish to view a currently airing episode of media content 112 in the form of a television program that is beginning its third broadcast season. Moreover, system user 108a may have viewed all episodes of the first broadcast season, but no episodes of the second broadcast season. In that use case, media content digest software code 130/230/330 may identify one or more constraints for content digest 128/228 based on the media consumption history of system user 108a with respect to media content 112 that is included in user profile 116.

In one such implementation, system 120/220/320 may provide content digest 128/228 as a catch-up sequence preceding delivery of the requested episode of media content 112 to system user 108a. Such a catch-up sequence may briefly summarize the first broadcast season of media content 112 to refresh the memory of system user 108a, and may proceed to summarize the second season in greater detail, thereby bringing system user 108a up-to-date on the storyline and character interactions. In other words, in some implementations, the one or more constraints for content digest 128/228 may be based on a media consumption history of system user 108a with respect to media content 112 on which content digest 128/228 is based.

Alternatively, or in addition, the one or more constraints for content digest 128/228 may be based on a content preference of system user 108a, determined based on the media consumption history of system user 108a, for example. Continuing with the exemplary use case described above, in which content digest 128/228 is provided as a catch-up sequence preceding delivery of a current episode of media content 112 to system user 108a, the one or more constraints imposed on generation of that catch-up sequence may be based on a content preference of preferences of system user 108a. Such a content preference or preferences may be determined based on the media consumption history of system user 108a included in user profile 116, and/or may be included in user profile 116 as a supplement to the media consumption history of system user 108a.

In one such implementation, media content digest software code 130/230/330 may identify a constraint for content digest 128/228 based on a content preference by system user 108a for action scenes over romance scenes, for example. In that case, the catch-up sequence provided as content digest 128/228 may emphasize action sequences included in the second broadcast season of media content 112 over romantic interactions amongst the characters during the second broadcast season.

Flowchart 460 continues with programmatically extracting content segments from media content 112 using metadata 114 indexed to the timecode of media content 112 and based on the one or more constraints identified in action 463 (action 464). Metadata 114 describing media content 112 and indexed to the timecode of that content enables an accurate mapping of media content 112 by media content digest software code 130/230/330. In addition, the one or more constraints for content digest 128/228 enable a precise partitioning of media content 112 using the one or more constraints and the mapping.

The programmatic extraction of content segments from media content 112 using metadata 114 and based on the one or more constraints identified in action 463 may be performed by system 120/220/320 using media content digest software code 130/230/330, executed by hardware processor 124/224/324. As noted above, the action of programmatically extracting content segments from media content 112 using metadata 114 and the one or more constraints identified in action 463 does not require the participation of a human editor or human content curator. In other words, media content digest software code 130/230/330, when executed by hardware processor 124/224/324, can perform action 464 substantially autonomously.

Flowchart 460 can conclude with generating content digest 128/228 based on media content 112 from the content segments programmatically extracted from media content 112 in action 464 (action 465). Generation of content digest 128/228 may be performed by system 120/220/320 using media content digest software code 130/230/330, executed by hardware processor 124/224/324.

As noted above, in some implementations, content digest 128/228 may include an abbreviated version of long form movie content or intermediate television programming content. Alternatively, and as further noted above, in some implementations, content digest 128/228 may include a catch-up sequence for a television series.

In other implementations, however, media content 112 may include other types of video content, and content digest 128/228 may include another type of video sequence. For example, in one implementation, media content 112 may include advertising or other promotional content, and content digest 128/228 may take the form of targeted advertising or targeted promotions tailored to preferences of one of system users 108a-108c. In yet another implementation, media content 112 may include video shorts, for example, and content digest 128/228 may include a mashup of video shorts or other media content tailored to the preferences of one of system users 108a-108c.

It is noted that, in some implementations, the method outlined by flowchart 460 may include additional actions related to machine learning. For example, subsequent to generation of content digest 128/228 in action 465, media content digest software code 130/230/330 may receive corrective feedback. In some implementations, that corrective feedback may be in the form of content compendium system 120/220 detecting that system users 108a-108c have terminated playback of content digest 128/228 prematurely, i.e., prior to its completion. In other implementations, a human editor may review content digest 128/228 and make corrections, i.e., additions, deletions, or modifications, to the content segments programmatically extracted from media content 112 in action 464.

The corrective feedback received by media content digest software code 130/230/330 may be used as training data by media content digest software code 130/230/330. Moreover, media content digest software code 130/230/330 may alter its process for programmatically extracting content segments based on that training data. In other words, in some implementations, media content digest software code 130/230/330 may be configured to learn from the corrective feedback it receives in response to generation of content digest 128/228, in order to improve the quality of content digests 128/228 programmatically generated in the future.

It is further noted that although the method outlined by flowchart 460 and discussed above has been described as being performed by content compendium system 120/220, using media content digest software code 130/230/330, that representation has been in the interests of conceptual clarity. As stated above with reference to FIG. 2, in some implementations, generation of content digest 128/228 may be performed on client system 140a-140c/240, or collaboratively by compendium system 120/220 and client system 140a-140c/240. In any of those implementations, media content digest software code 130/230/330 and/or media digest client application 232b may be configured to add new content, or modify the end of two content segments being connected, to render content digest 128/228 more comprehensible, or to otherwise enhance the experience of system users 108a-108c.

For example, audio at the beginning or end of content segments that will be connected in content digest 128/228 may be automatically adjusted to avoid abrupt changes. Alternatively, or in addition, transition images or sequences, such as a black screen or short animation, can be added to signal a change of topic or a change in the storyline.

Thus, present application discloses systems and methods for programmatic generation of media content digests. By identifying media content for use in generating a content digest, and accessing metadata describing the media content and indexed to a timecode of that content, the present solution can determine an accurate mapping of the media content. Moreover, by identifying one or more constraints for the content digest, and programmatically extracting content segments from the media content using the metadata and the one or more constraints, the present solution advantageously performs a precise partitioning of the media content. Those precisely partitioned content extracts can then be assembled to generate the content digest based on the media content.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. A system comprising:
a server including a server processor and a system memory;
a media content digest software code stored in the system memory;
a client device including a client processor and a client memory storing a media content digest client application;
the server processor configured to execute the media content digest software code to:
receive, from a user, a selection of a first storyline type from a plurality of storyline types of a media content;
update a content preference of the user based on the selection of the first storyline type by the user;
receive a request from the client device for a content digest, the request being indicative of a desired time duration for the content digest;
identify the media content for generating the content digest, the media content including a plurality of timecodes defining time intervals of the media content, the content digest being an abbreviated version of the media content;
access a plurality of metadata describing the media content, each of the plurality of metadata being indexed to a different one of the plurality of timecodes, the plurality of metadata including the plurality of storyline types of the media content; and
programmatically extract a plurality of content segments from the media content, using the plurality of metadata including the plurality of storyline types, each of the plurality of content segments being indexed to a respective one of the plurality of timecodes, wherein extracting the plurality of content segments is tailored according to the desired time duration and the updated content preference of the user;
the client processor configured to execute the media content digest client application to:

generate the content digest on the client device, as the abbreviated version of the media content, from the plurality of content segments, wherein the content digest emphasizes the first storyline type over other one or more of the plurality of storyline types of the media content.

2. The system of claim 1, wherein the media content comprises video content, and the content digest comprises a video sequence.

3. The system of claim 1, wherein the media content comprises television programming content or movie content.

4. The system of claim 1, wherein the media content comprises advertising content.

5. The system of claim 1, wherein the media content is one episode of a plurality of episodes, and wherein extracting the plurality of content segments is further tailored according to a media consumption history of the user indicating one or more episodes of the plurality of episodes previously watched by the user, to provide a catch-up sequence to the user based on the one or more previously watched episodes.

6. A method for use by a system including a server having a server processor and a system memory storing a media content digest software code, and a client device having a client processor and a client memory storing a media content digest client application, the method comprising:
receiving, from a user, using the server processor, a selection of a first storyline type from a plurality of storyline types of a media content;
updating, using the server processor, a content preference of the user based on the selection of the first storyline type by the user;
receiving, using the server processor, a request from the client device for a content digest, the request being indicative of a desired time duration selected by the user for the content digest;
identifying, using the server processor, the media content for generating the content digest, the media content including a plurality of timecodes defining time intervals of the media content, the content digest being an abbreviated version of the media content;
accessing, using the server processor, a plurality of metadata describing the media content, each of the plurality of metadata being indexed to a different one of the plurality of timecodes, the plurality of metadata including the plurality of storyline types of the media content;
programmatically extracting, using the server processor, a plurality of content segments from the media content, using the plurality of metadata including the plurality of storyline types, each of the plurality of content segments being indexed to a respective one of the plurality of timecodes, wherein extracting the plurality of content segments is tailored according to the desired time duration and the updated content preference of the user; and
generating, using the client processor, the content digest on the client device, as the abbreviated version of the media content, from the plurality of content segments, wherein the content digest emphasizes the first storyline type over other one or more of the plurality of storyline types of the media content.

7. The method of claim 6, wherein the media content comprises video content, and the content digest comprises a video sequence.

8. The method of claim 6, wherein the media content comprises television programming content or movie content.

9. The method of claim 6, wherein the media content comprises advertising content.

10. The method of claim 6, wherein the media content is one episode of a plurality of episodes, and wherein extracting the plurality of content segments is further tailored according to a media consumption history of the user indicating one or more episodes of the plurality of episodes previously watched by the user, to provide a catch-up sequence to the user based on the one or more previously watched episodes.

11. The system of claim 1, wherein the server processor is further configured to execute the media content digest software code to render the content digest on a display.

12. The method of claim 6, further comprising rendering the content digest on a display for the user.

13. A system comprising:
a server including a server processor and a system memory;
a media content digest software code stored in the system memory;
a client device including a client processor and a client memory;
a media content digest client application stored in the client memory;
the server processor configured to execute the media content digest software code to:
receive, from a user, a selection of a first storyline type from a plurality of storyline types of a media content;
update a content preference of the user based on the selection of the first storyline type by the user;
receive a request from the client device for a content digest, the client device having an identification;
identify the media content for generating the content digest, the media content including a plurality of timecodes defining time intervals of the media content, the content digest being an abbreviated version of the media content;
access a plurality of metadata describing the media content, each of the plurality of metadata being indexed to a different one of the plurality of timecodes, the plurality of metadata including the plurality of storyline types of the media content;
detect the identification of the client device;
set a time duration for abbreviating the media content based on the detected identification of the client device; and
programmatically extract a plurality of content segments from the media content, using the plurality of metadata including the plurality of storyline types, each of the plurality of content segments being indexed to a respective one of the plurality of timecodes, wherein extracting the plurality of content segments is tailored according to the desired time duration and the updated content preference of the user;
the client processor configured to execute the media content digest client application to:
generate the content digest on the client device, as the abbreviated version of the media content, from the plurality of content segments, wherein the content digest emphasizes the first storyline type over other one or more of the plurality of storyline types of the media content.

14. The system of claim 13, wherein the identification of the client device identifies the client device as a mobile device.

\* \* \* \* \*